United States Patent [19]
Vidjak

[11] 3,774,814
[45] Nov. 27, 1973

[54] METERING APPARATUS
[75] Inventor: Frank V. Vidjak, Long Beach, Calif.
[73] Assignee: Star-Kist Foods Inc., Terminal Island, Calif.
[22] Filed: Oct. 26, 1971
[21] Appl. No.: 192,337

[52] U.S. Cl. ................ 222/220, 222/238, 222/346, 222/367
[51] Int. Cl. ........................................... G01f 11/10
[58] Field of Search ................ 222/220, 238, 342, 222/345–349, 367, 368, 236

[56] References Cited
UNITED STATES PATENTS
| | | | |
|---|---|---|---|
| 3,072,301 | 1/1963 | Burke | 222/368 |
| 912,628 | 2/1909 | Sherman | 259/41 X |
| 2,593,516 | 4/1952 | Alley | 222/238 |
| 3,159,309 | 12/1964 | Kempton | 222/238 |

FOREIGN PATENTS OR APPLICATIONS
718,646  11/1931  France .............................. 222/220

Primary Examiner—Stanley H. Tollberg
Assistant Examiner—Thomas E. Kocovsky
Attorney—Fulwider et al.

[57] ABSTRACT

A metering apparatus including a hopper formed with a centrally disposed outlet in its lower wall. A cylindrical metering drum is disposed in closing confrontation with the outlet and is formed with a plurality of longitudinal metering cavities for receiving a measured quantity of material from the hopper. Drive means rotates the metering drum to sequentially register the metering cavities with the outlet to receive measured quantities of material from the hopper and then dump such material as the respective cavities are rotated out of registration with the outlet.

4 Claims, 5 Drawing Figures

INVENTOR.
FRANK V. VIDJAK
BY Fulwider, Patton, Rieber, Lee and Utecht
ATTORNEYS

INVENTOR.
FRANK V. VIDJAK
BY Fulwider, Patton, Rieber,
Lee and Utecht
ATTORNEYS

METERING APPARATUS

This is a continuation of application Ser. No. 861,681, filed Sept. 29, 1969 now abandoned.

BACKGROUND OF THE INVENTION

1. Field of the Invention

The present invention relates to an apparatus for continuous dispensation of material at a predetermined rate.

2. Description of the Prior Art

Metering devices have been proposed which include a hopper having a baffle therein which is agitated by a rotary spoked wheel to effect dispensation of granular material. A device of this type is shown in U.S. Pat. No. 3,266,677. Devices of this type suffer the shortcoming of failing to provide for highly accurate rates of dispensation and are totally ineffective for metering of moist cohesive material.

There are no metering apparatuses known to applicant which include a hopper having its bottom wall formed with an outlet which has a cylindrical metering element supported rotatably in plugging confrontation therewith, such metering element being formed with a plurality of peripherally arranged outwardly-opening metering cavities which are selectively rotated into registration with the outlet so as to be filled with the material from the hopper. The material is then dumped from the cavities as the element is rotated out of registration with the outlet.

SUMMARY OF THE INVENTION

The metering apparatus of present invention is characterized by a cylindrical metering element rotatably supported in confrontation with an outlet formed in the bottom of a hopper, such metering element being formed with a plurality of peripherally arranged outwardly opening metering cavities which sequentially register with the outlet as the element is rotated to fill the respective cavities with measured quantities of the material from the hopper whereby the material will be dumped from the cavities as they are rotated out of registration with the outlet to thereby dispense the material at a rate corresponding to the rotational speed of the element.

An object of the present invention is to provide a metering apparatus which dispenses material at a predetermined rate and which is adapted to dispense the material at a uniform thickness across a selected path.

Another object of the present invention is to provide a metering apparatus of the type described which includes rotating agitators for agitating the material in the hopper to avoid compaction thereof and enable dispensation at a constant rate.

Still another object of the present invention is to provide a metering apparatus of the type described which includes an idler for cleaning each of the metering cavities during every rotation of the metering element.

These and other objects and the advantages of the present invention will become apparent from a consideration of the following detailed description, when taken in conjunction with the accompanying drawings.

DESCRIPTION OF THE PREFERRED EMBODIMENT

Figure 1:
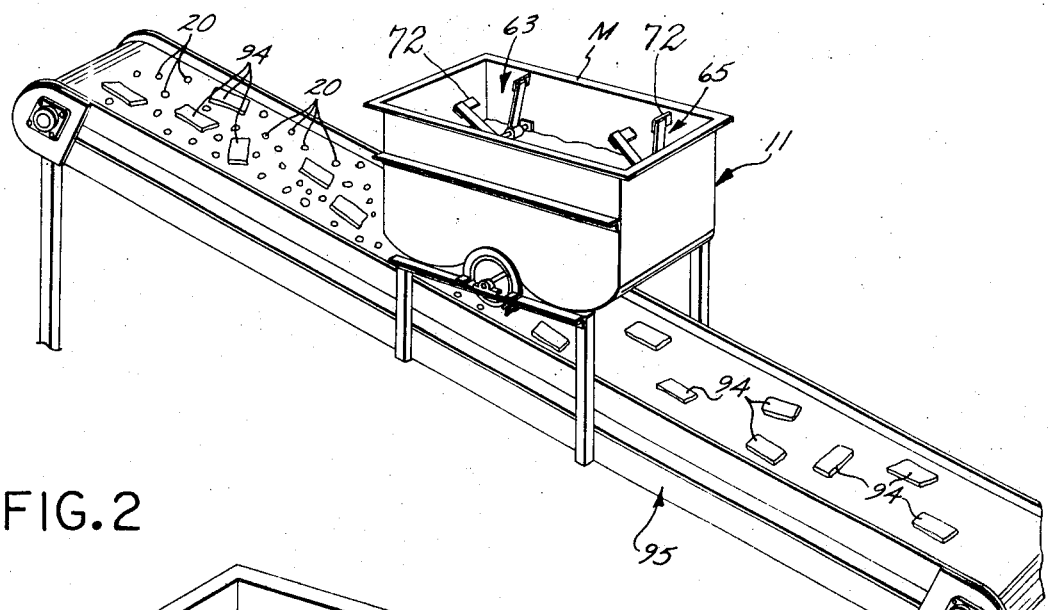
FIG. 1 is a perspective view of a metering apparatus embodying the present invention.

The metering apparatus M of present invention includes, generally, a hopper 11 having its bottom wall formed with an elongated transverse opening 13 (FIG. 5) which has a rotatable hollow metering drum 17 supported in blocking confrontation therewith. The metering drum 17 is formed with a plurality of longitudinal metering cavities 19, and stationary semi-cylindrical plate portion 21 is telescoped within the drum 17 and is clocked to also confront the opening 13 and block direct passage through the cavities 19 of material being dispensed from the hopper 11. Thus, the drum 17 may be rotated a selected speed and as the cavities 19 register with the outlet 13, measured quantities of the material 20 in the hopper 11 will be received in each cavity, and will be moved across the upper surface of the back-up plate 21 and be dumped from the drum 17 as the respective cavities 19 are rotated out of registration with the outlet 13.

The hopper 11 is generally box-shaped and is formed with semi-cylindrical bottom portions 25 and 27 disposed on opposite sides of the drum 17 and having respective downwardly projecting divergent skirts 29 and 31 which extend around the drum 17 for short distances in opposite directions.

Figure 4:
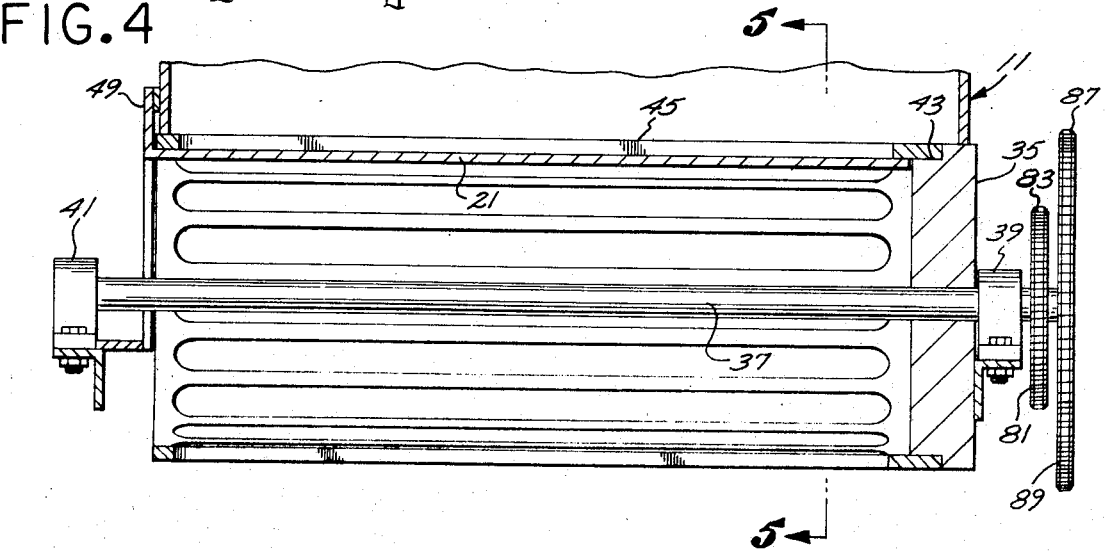
FIG. 4 is a vertical sectional view, in enlarged scale, taken along the line 4—4 of FIG. 3.

Referring to FIG. 4, the drum 17 includes an end plate 35 which is fixedly supported on a shaft 37 having its opposite ends journaled in pillow blocks 39 and 41 supported from the hopper 11. The end plate 17 is stepped at 43 for telescopically receiving one end of a cylindrical shell 45 in which the longitudinal slots, or metering cavities 19, are formed.

Figure 5:
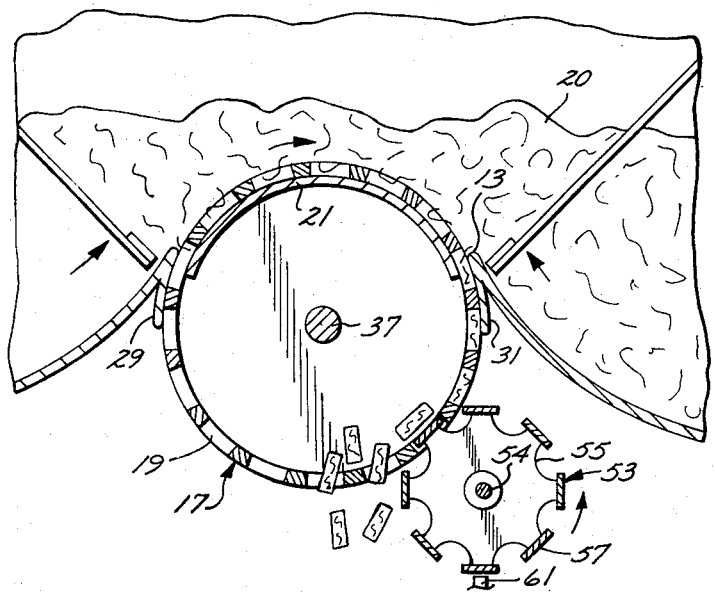
FIG. 5 is a vertical sectional view taken along the line 5—5 of FIG. 4.

Referring to FIGS. 4 and 5, the semi-cylindrical stationary back-up plate 21 is telescoped into the open end of the shell 45 and includes a radially outwardly extending flange 49 which is secured to the hopper 51 whereby such plate will serve to support the open end of the drum 17.

Still referring to FIG. 5, a cleaning idler, generally designated 53, is rotatably supported on a shaft 54 adjacent the drum 17 and includes a pair of spaced sprockets 55 which have radially outwardly projecting spokes that mount cleaning bars 57 on their ends. The cleaning bars 57 are shaped to complimentally interfit the metering cavities 19 whereby each metering cavity will be cleaned on each revolution of the metering drum 17. Supported below and adjacent the cleaning idler 53 is a scraper slat 61 which serves to scrape the cleaning bars 57.

Figure 2:
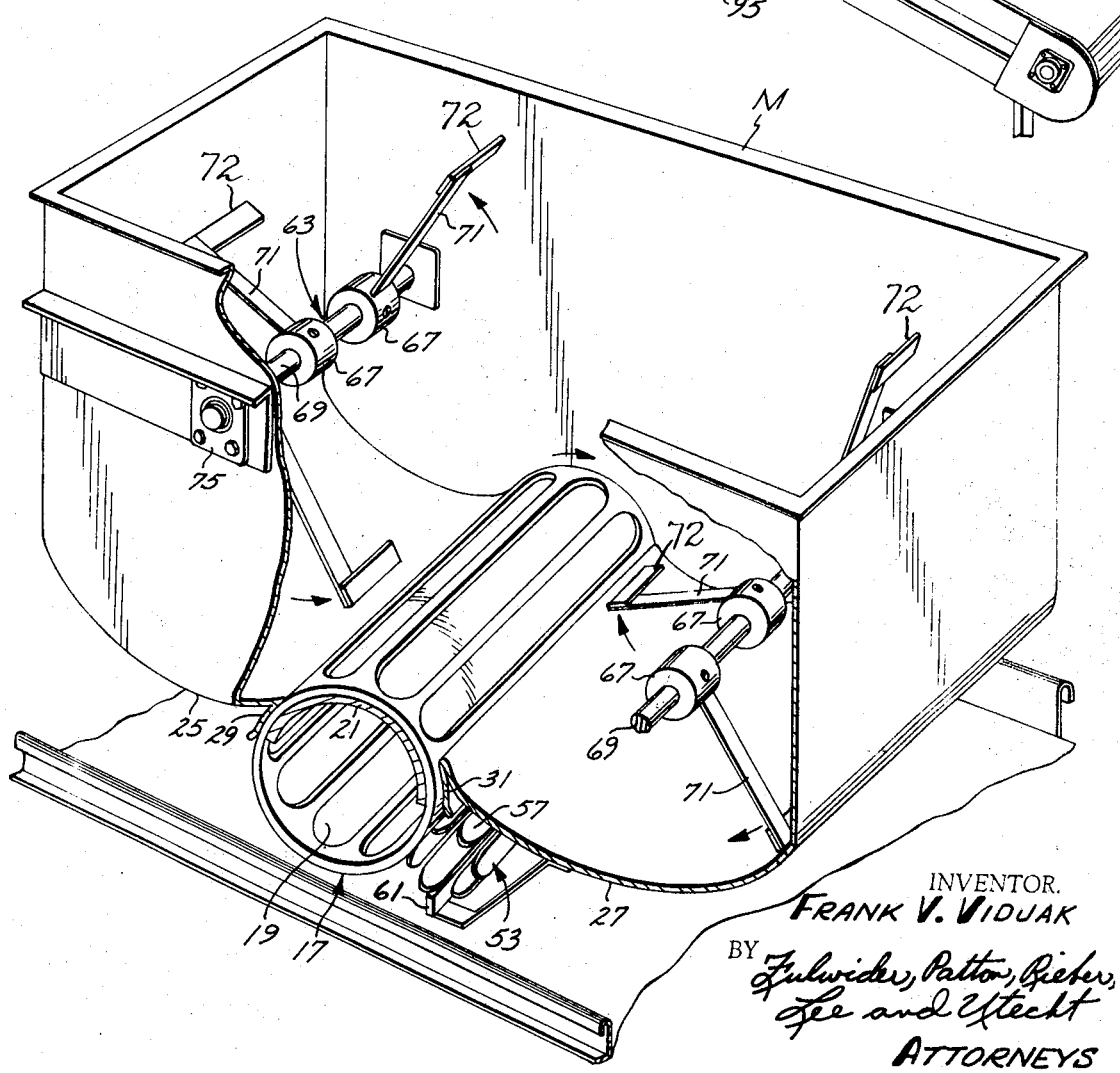
FIG. 2 is a perspective view, in enlarged scale and partially broken away, of the metering apparatus shown in FIG. 1.

Referring to FIG. 2, a pair of agitators, generally designated 63 and 65, are disposed in opposite halves of the hopper 11 and include a plurality of collars 67 nonrotatably secured to rotatable shafts 69 and mounting radially outwardly projecting paddles 71. Opposite ends of the shafts 69 project through the sidewalls of the hopper 11 and are carried in bearing housings 75.

Figure 3:
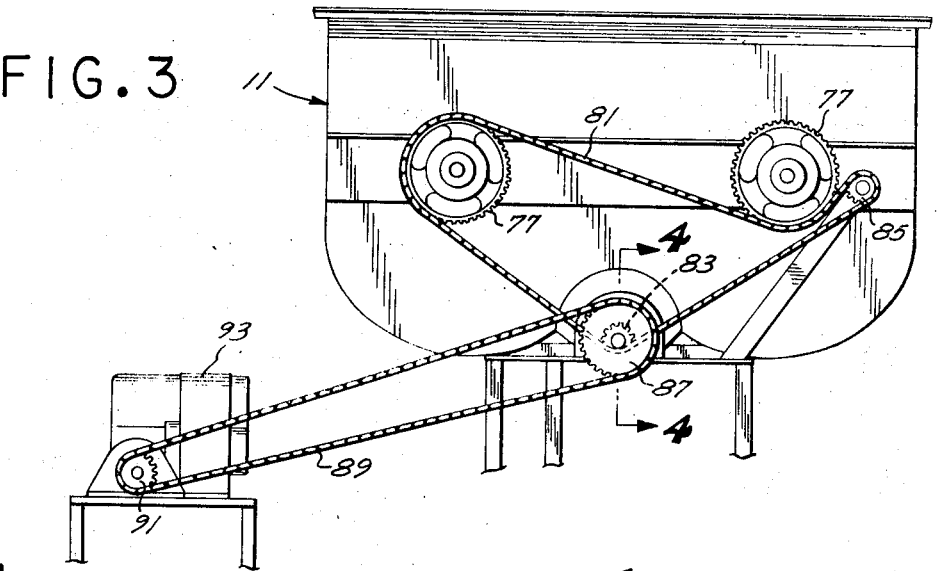
FIG. 3 is a rear elevational view, in enlarged scale, of the metering apparatus shown in FIG. 1.

Referring to FIG. 3, each of the agitator shafts 69 mount driven sprockets 77 on their projecting ends, such sprockets having a drive chain 81 threaded thereon and said chain also being threaded over a drive sprocket 83 carried on the mounting shaft 37 of the metering drum 17 and on a tightening idler 85. A driven sprocket 87 is fixedly mounted on the end of the drum shaft 37 adjacent the driven sprocket 83 and has a drive chain 89 connected therewith, such chain 89 being threaded on a drive sprocket 91 of a drive motor 93.

The metering apparatus M has been found particularly useful for spreading flaked bonito and rehydrated vegetables at a uniform rate onto bonito loins 94 traveling along a conveyor generally designated 95 ( FIG. 1 ).

Bonito fish are formed with four longitudinal loins which constitute prime quality and it is desirable to spread the flaked fish material and rehydrated vegetable onto the loins 94 as they are fed upwardly along the conveyor 95 to provide a uniform combination of large and small pieces of bonito intermittently mixed with rehydrated vegetable which is fed off the upper end of the conveyor and uniformly into cans ( not shown). This combination of materials is frequently referred to as "Bonito in Dressing Sauce."

In the past, it has been common practice to employ several workers to manually spread flaked bonito and vegetables on loins of bonito but this has proven unsatisfactory because of the inconsistency in spreading which results in some cans of Bonito in Dressing Sauce containing literally no flakes or vegetables while other cans contain more than the desired ratio.

In operation, the metering apparatus M may be mounted over the conveyor 95 as shown in FIG. 1 with the metering drum 17 extending perpendicular to the conveyor belt to provide for uniform metering across the entire width of such belt. Obviously, if a narrower conveyor 95 were used the metering apparatus M could be mounted with the drum at an angle to extend diagonally across the width of the conveyor belt.

The hopper 11 is filled with a material 20 such as bonito flakes and/or vegetables and the drive motor 93 operated to commence rotation of the metering drum 17 and the agitator 63. It is noted that the agitators 63 are rotated in opposite directions with the paddles 71 moving upwardly over the drum 17 to therefore kick the flaked bonito upwardly away from such drum to prevent compaction and maintain a substantially uniform force pressing the flaked bonito downwardly into the cavities 19 whereby a substantially constant metering rate will be maintained irrespective of the degree of fullness or emptiness of the hopper 11. The metering cavities moved upwardly into registration with the opening 13 (FIG. 5) will be filled with flaked bonito 20 dropping downwardly therinto and such bonito will be moved clockwise across the surface of the stationary back-up plate 21 and when the respective cavities clear the opening 13, back-up plate 21 and skirt 31, the bonito in such cavities will fall freely downwardly onto the chucks or loin bonito being carried upwardly on the conveyor 95. Any bonito which does not fall clear of the cavities 19 in this manner will be kicked loose by the cleaning bars 57 of the cleaning idler 53 and will fall out the cavities 19 and onto the conveyor 95. Thus, the mixture fed off the upper end of the conveyor 95 will be chuck or loin bonito with a uniform layer of flaked bonito and/or vegetables spread thereon for deposit in cans to provide a uniform consistency from can to can.

From the foregoing, it will be apparent that the metering apparatus of present invention provides for convenient and accurate metering of material from the hopper and that the rate of dispensation may be adjusted by merely adjusting the speed of the metering drum. Further, the rate of dispensation is independent of the amount of material remaining in the hopper.

Various modifications and changes may be made with regard to the foregoing detailed description without departing from the spirit of the invention.

I claim:

1. Food particle metering apparatus for metering compactable food particles and comprising:
   a hopper formed in its lower portion with an elongated horizontally extending outlet in the bottom thereof;
   an elongated cylindrical hollow metering shell disposed horizontally in said outlet and including a circumferential wall having elongated through radial slots defining metering cavities;
   a semicylindrical backing plate telescoped in said shell and confronting said outlet to block direct passage of said meat through said cavities;
   mounting means mounting said shell for rotation in said outlet;
   agitator means disposed in said hopper and having its axis disposed horizontally and including a plurality of radially projecting spokes terminating in paddles arranged to rotate upwardly through a path passing immediately adjacent said outlet to sequentially engage said particles and carry such particles toward said outlet and then upwardly and away therefrom to spill from said paddles and back over said outlet; and
   drive means for rotating said shell and said agitator means to move said cavities sequentially into engagement with said opening and to rotate said paddles to sequentially engage said particles to move them toward said outlet and to then drop them on said shell to maintain said particles substantially uniformly loose in said metering cavities to thereby provide uniform amounts of said meat in said cavities for uniform metering thereof.

2. Metering apparatus as set forth in claim 1 wherein: said agitator means includes an axle shaft having said paddles spaced axially therealong at equidistances.

3. Metering apparatus as set forth in claim 1 that includes:
   a cleaning idler rotatably supported adjacent said metering shell and including a plurality of cleaning bars for interfitting said cavities to engage therewith to be rotated by said shell to clean said material from said cavities; and
   a scraping slat supported adjacent said cleaning idler for scraping said material from said bars.

4. Metering apparatus as set forth in claim 1 wherein: said hopper is formed with semi-cylindrical bottom portions disposed on opposite sides of said drum;
   said agitator means includes a pair of agitators disposed on opposite sides of said drum and including respective axle shafts disposed at the center of the respective cylinder of which said semi-cylinders form a part; and
   said drive means drives said agitators in opposite directions to cause said paddles to kick said material upwardly from opposite sides of said drum.

\* \* \* \* \*